March 29, 1966   M. R. KUEHNLE   3,242,755
TOROIDAL TRANSMISSION

Filed Feb. 11, 1965   2 Sheets-Sheet 1

INVENTOR.
MANFRED R. KUEHNLE
BY
Blair & Buckles
ATTORNEYS

March 29, 1966 M. R. KUEHNLE 3,242,755
TOROIDAL TRANSMISSION
Filed Feb. 11, 1965 2 Sheets-Sheet 2

INVENTOR.
MANFRED R. KUEHNLE
BY
Blair & Buckles
ATTORNEYS

United States Patent Office 3,242,755
Patented Mar. 29, 1966

3,242,755
TOROIDAL TRANSMISSION
Manfred R. Kuehnle, 304 Marrett Road,
Lexington, Mass. 02173
Filed Feb. 11, 1965, Ser. No. 431,790
14 Claims. (Cl. 74—424.5)

This invention relates to a transmission. It relates more specifically to an improved toroidal transmission having exceptionally high accuracy and efficiency as well as high torque capability and reduction ratio.

The toroidal transmission is a relatively new concept. Generally, it has comprised a plurality of tape-like helical elements mounted for rotation on and spaced along a ring. In these prior devices the helical elements are positioned with their edges in a helical stator groove whose axis coincides with the ring. Thus, the envelope described by the elements is a toroid. When the helical elements are rotated about the ring, they advance along the groove, with a number of rotations of the helix being required for each complete circuit of the groove. The output of the toroidal transmission is taken from the ring. A further reduction arises from the fact that several revolutions of an input worm coupled to the helical elements are required for each rotation of the helical elements about their axis.

These prior transmissions have achieved considerable success in terms of maximum torque for a minimum volume. However, they exhibit some drawbacks which limit their use in some applications. More specifically, they employ non-rigid or flexible helical elements which, by nature of their flexibility, can follow the varying lead angle of the toroidal-helical stator groove. They are connected to the ring, from which the output is taken, by spokes. As the elements advance around the groove, they undergo a certain amount of flexing and bending, particularly when the output is connected to a heavy load. As a result, these prior toroidal transmissions have a fluctuating gear reduction ratio, manifesting itself in an unevenness of output motion.

In addition, the proper lubrication of the prior toroidal transmissions has been a problem. The helical elements, by virtue of their tape-like construction, must slide in the stator groove. The resulting friction materially reduces efficiency. It also prevents transmission of power in the reverse direction, a capability which is desirable in many applications.

Accordingly, this invention aims to provide an improved toroidal transmission which has high torque capability yet is characterized by improved accuracy and efficiency.

A further object of this invention is to provide a transmission of the above type which attains a high gear reduction ratio for a given weight and size.

Another object of this invention is to provide an improved toroidal transmission having a substantially constant gear ratio.

A further more specific object of this invention is to provide a toroidal transmission of the above type which has a high gear ratio yet is reversible. That is, it can be operated either to increase or decrease speed.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

In general, the transmission of this invention employs an array of special circular ball bearing units which are mounted for rotation on and spaced apart along an axis. The bearing units are adapted to ride in a generally helical groove structure having multiple-thread configuration, i.e. a plurality of parallel grooves. Each individual ball in a given bearing unit engages within a different groove. The bearing units are rotated about their axes and the resultant movement of the balls in the respective grooves causes the units to advance along the helical groove structure. The displacement of the bearing units along the helical groove constitutes the output of the transmission. It is taken from a shaft coupled to the axis of the bearing units.

In the preferred embodiment of this invention, the ball bearing units are rotatively mounted in fixed spaced relation around a ring. Further, the "helical" groove structure in which they ride is turned upon itself to form a toroid, with the common axis of the "helices" coinciding with the ring. The bearing units are rotated about the ring by an input worm, and upon rotation, they advance around the helices, carrying the ring with them.

It takes several revolutions of the worm to rotate the bearing units about the ring. Also, a number of rotations of the bearing units on the ring are required for each revolution of it. Accordingly, the transmission is capable of considerable gear reduction.

Figure 1:
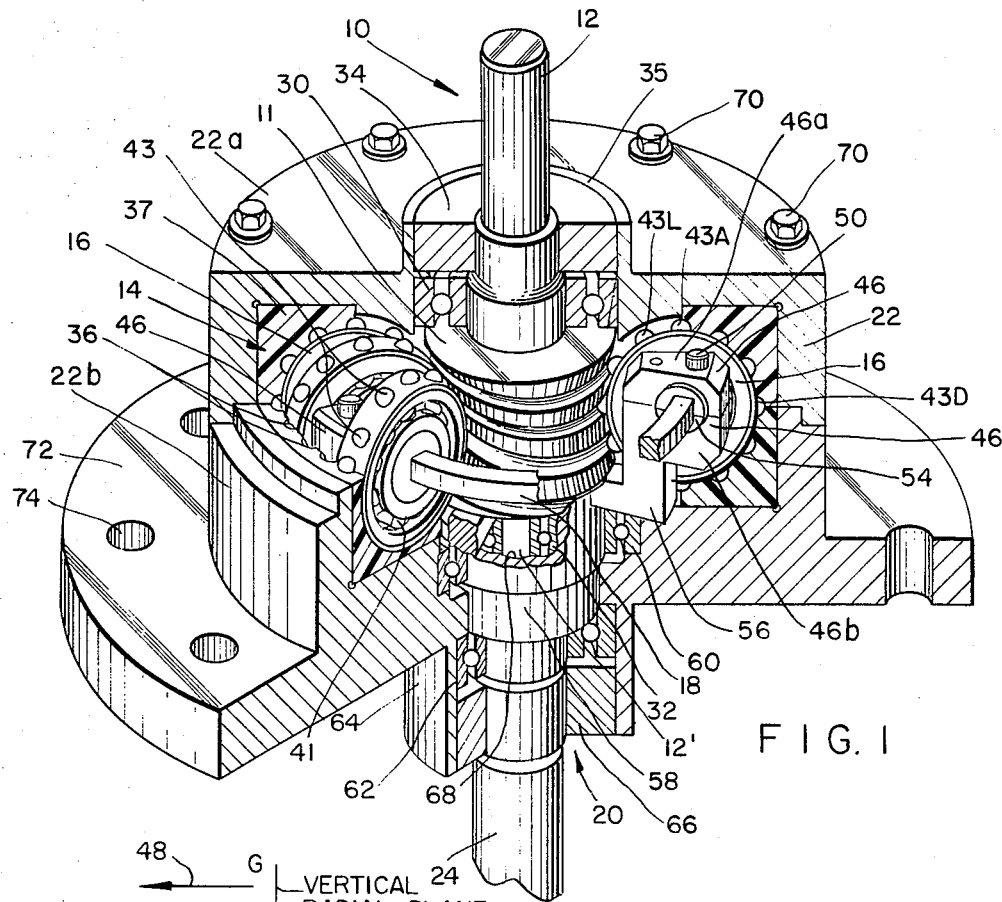
FIG. 1 is a perspective view, partly broken away, of a transmission embodying the principles of my invention.

Referring now to FIG. 1, my improved transmission comprises an input section, indicated generally at 10, including a worm 11 formed on a rotative shaft 12. The input section 10 is coupled to an intermediate section, indicated generally at 14, comprising an array of circular ball bearing units 16 in engagement with worm 11 and rotatively mounted at spaced-apart locations on a circular ring 18. Finally, the transmission also includes an output section 20 made up of a helically grooved housing indicated generally at 22 and an output shaft 24 journaled within the housing 22 and connected to the ring.

The input to the transmission is in the form of rotation of the shaft 12 and the output is taken from the shaft 24, which rotates relative to the housing 22.

More specifically, the input shaft 12 is journaled for rotation within housing 22 in bearings 30 and 32 positioned immediately above and below worm 11. The shaft 12 has a reduced diameter portion 12' rotatively supported by the output shaft 24 as will be described more particularly later. Packing 34 above bearing 30 is contained by a collar 35 extending upwardly from the housing 22.

In the intermediate section 14, the ring 18 is coaxial with shaft 12 and the bearing units 16 extending radially outwardly from the points where they engage the worm 11. Each bearing unit has a peripheral array of balls 43A–43L. Those of balls 43 facing worm 11 interfit therewith so that rotation of the worm in one direction or the other will cause corresponding rotation of the bearing units 16 in unison about the ring 18.

The bearing units 16 are also adapted to roll in an assemblage of parallel helix-like races 36A–36L inscribed in a toroidal enclosure 37 within housing 22. The races form in essence a multiple thread system which is interrupted in the area facing the worm 11. Thus, they turn back on themselves to form continuous paths for the bearing units 16.

Figures 3, 4, 5:
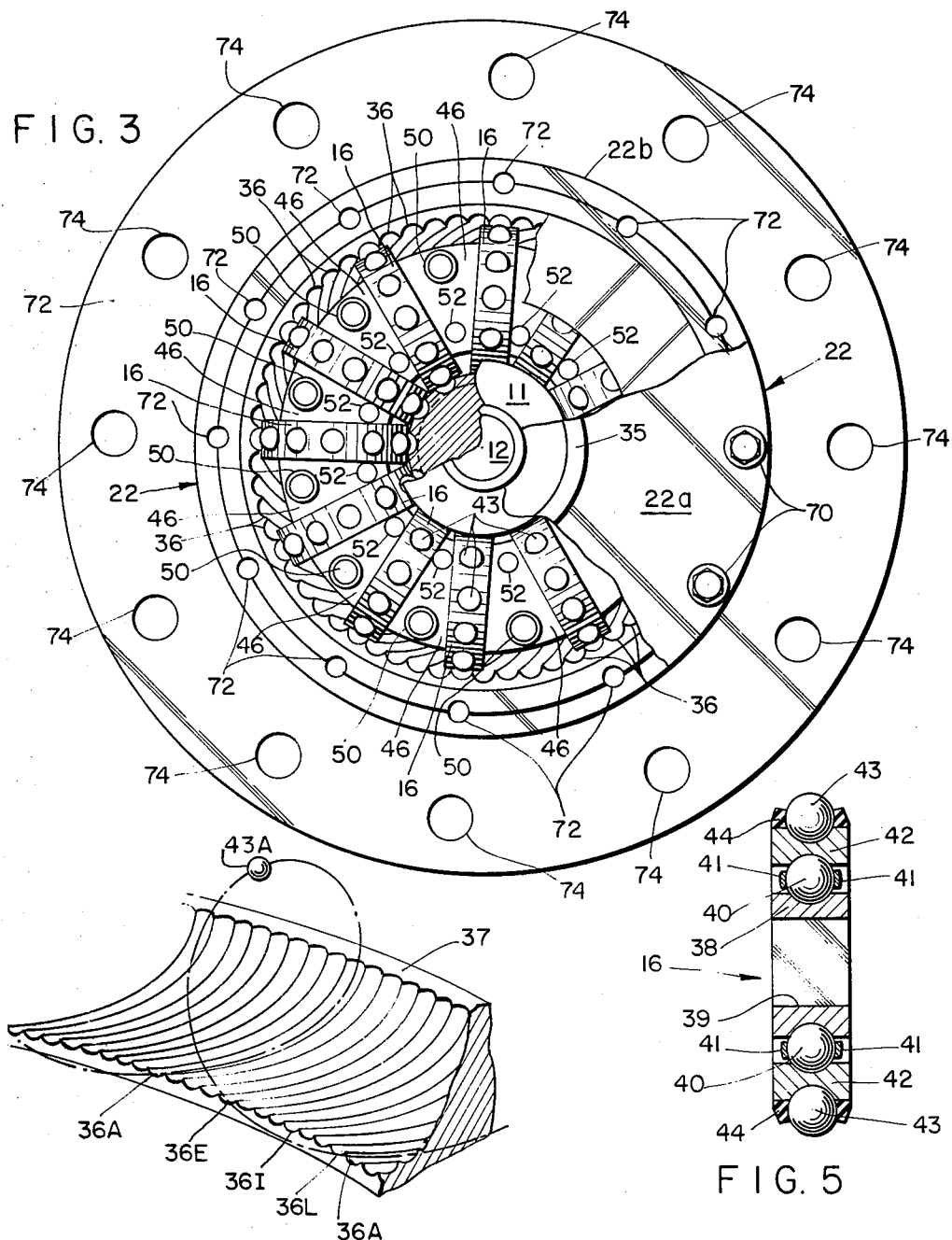
FIG. 3 is a top plan view of the transmission, with parts broken away to facilitate an understanding of its construction.
FIG. 4 is a fragmentary view of the groove structure of the transmission.
FIG. 5 is a vertical sectional view of a bearing unit used in the transmission of FIG. 1.

More specifically, as shown in FIG. 5, in the preferred embodiment of my invention, each bearing unit 16 comprises an inner ring 38 having a square-shaped central opening 39 fitting the ring 18. Ring 38 forms an inner race for an inner array of balls 40 held in spaced relation by a conventional retainer cage 41. The balls are encircled by an intermediate ring 42 which is channelled on both sides to form not only an outer race for balls 40, but also an inner race for a peripheral array of twelve balls 43A–43L. The exposed array of balls 43 is held in spaced relation by a strong outer retainer cage 44. The ring 42 forming the double race absorbs axial thrusts on the balls 43 and transmits such forces to the ring 38 by way of the balls 40.

In turn, the rings 38 of the bearing units transmit the thrusts to the shaft 18 by means of spacer-clamps 46 which fix the units 16 along the shaft as described below.

In accordance with this invention and contrary to conventional bearing practice, the balls 43 of each unit 16 ride in different ones of the races 36. Thus, the twelve races 36A–L inscribed in the toroidal enclosure 37 accommodate the twelve balls 43A–L used in the illustrated transmission. By way of example, the pitch of each of the races 36 is such that they undergo six rotations around the shaft 18 in completing a revolution around the enclosure 37.

Figure 2:
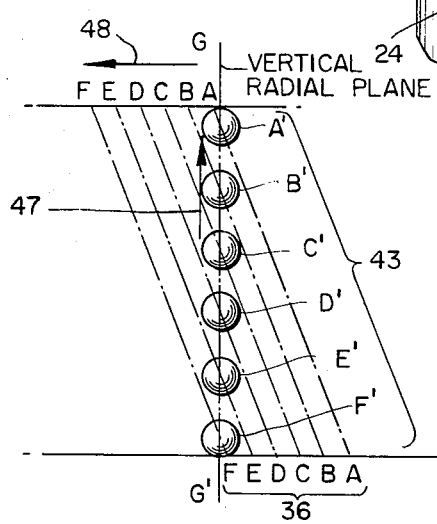
FIG. 2 is a schematic representation of a bearing unit positioned within the groove structure of the transmission of FIG. 1.

As seen in FIG. 2, when a bearing unit 16 is rotated about ring 18 so that the six balls 43A–43F within enclosure 37 move up in their corresponding races 36A–F, in the direction of the arrow 47, they will follow the dotted line paths and the entire bearing unit will be displaced to the left as indicated by the other arrow 48. If the balls move down in their respective races 36A–F, the bearing unit will, of course, be displaced to the right.

FIG. 4 shows the path of one peripheral ball, say ball 43A of a bearing unit 16, traveling in its race 36A, as the bearing unit 16 advances along the enclosure 37. The ball 43A follows a helix-like path, rolling in every twelfth channel cut in the enclosure 37.

Thus, as the worm 11 (FIG. 1) turns in one direction or the other, it rotates the bearing units 16 in unison by engaging three balls of each bearing unit. The rotating bearing units move in one direction or the other along races 36A–L and are thereby displaced along the enclosure 37. Since the bearing units 16 are axially fixed to ring 18, they carry the ring with them, causing the ring to revolve about worm 11 within the housing 22.

Referring to FIGS. 1 and 3, the illustrated transmission has twelve bearing units 16 distributed around the 360° ring 18. One might expect that the bearing units 16 would be spaced apart by equal angles of 30°. This would be the case if the threads on the worm 11 were not inclined with respect to the axis of the worm. However, the threads of the worm 11 are of course inclined. Therefore, proceeding counterclockwise around the ring 18 (FIG. 3), each successive bearing unit 16 is displaced about its own axis by a successively greater amount in order to interfit with the downwardly inclining worm threads. Consequently, the positions of the bearing unit balls 43 along the races 36 must differ among successive bearing units 16 and this requires a bearing unit interval different from 30°.

Specifically, in the transmission described herein the "windup" of successive bearing units 16 amounts to about 50 minutes of arc along the shaft 18. The bearing unit interval is thus 29°10′. With this spacing, the total arc for twelve bearing units would be 350°, leaving an additional gap of 10° between the twelfth and first units. Preferably, this added gap is divided into two parts of 5° each, between the sixth and seventh and between the twelfth and first units 16.

This will be more readily understood by bearing in mind that in the assembled transmission each outer ball 43 of a bearing unit 16 bears a unique positional relationship to each ball 43 in the other bearing units. This results from the fact that each ball rides in one given race 36. Thus the balls 43A ride in the race 36A, the balls 43B in race 36B, and so on.

Next assume a single-thread worm pitched to provide the 29°10′ spacing between adjacent bearing units 16 from the first unit 16 around to the twelfth unit. Also assume that in all twelve bearing units the outer balls 43A are in engagement with the same turn of this single-thread worm 11. Finally assume the addition of a thirteenth bearing unit 16 after the twelfth unit. If this unit is spaced 29°10′ from the twelfth unit, its outer ball 43A will also engage the same turn of the worm 11. Suppose, however, that the hypothetical thirteenth unit 16 is displaced an additional 10° from the twelfth unit. In that case, the engagement of its outer balls 43 with races 36 in the housing 22 requires an additional 60° rotation of this unit (using the six turns-per-revolution race pitch discussed above). This corresponds to rotation of the bearing unit by two balls 43 (using twelve balls in each bearing unit). Thus the outer ball 43C will ride in the worm instead of the ball 43A.

It will be observed that the hypothetical thirteenth bearing unit 16 is actually the first unit, which has the additional 10° spacing from the twelfth bearing unit. The outer ball 43C of the first unit engages the worm immediately below the ball 43A of this bearing unit, at the beginning of the next turn of the worm. In the preferred embodiment of the invention, I have divided the 10° gap into two portions. The seventh bearing unit 16 is displaced an additional 5° from the sixth unit. This results in an additional 30″ rotation of the seventh to the twelfth units 16, or an indexing of these units by one ball 43. There is a similar indexing between the twelfth and first bearing units making a total of 10°.

It will be observed that the pitch of the postulated single thread on the worm 11 corresponds to a bearing unit rotation of 60°. This means that between two consecutive turns of the worm thread, there is an unengaged ball 43. This ball is accommodated by a second thread interwound with the first thread to provide a double-thread configuration as shown in FIG. 1.

As mentioned previously, the wedge shaped spacer-clamps 46 maintain the bearing units 16 in the proper position on ring 18. There are a total of twelve such clamps. Ten of these occupy an angle providing the 29°10′ interval discussed above, while two clamps on opposite sides of the ring 18 occupy an angle of approximately 34°10′. These two larger clamps separate the sixth and seventh units 16 and the twelfth and first units 16, as discussed previously. Each spacer-clamp 46 comprises an upper section 46a and a lower section 46b which clamp together around ring 18. The two clamp sections are held tightly together by bolts 49 extending down through ring 18. Locating pins 52 (FIG. 3) facilitate aligning the clamp sections 46a and 46b. Also, the sides of the spacer-clamps 46 may be provided with raised bosses 54 (FIG. 1) so that the clamps will not interfere with the movable elements of bearing units 16.

As best seen in FIG. 1, power take-off from ring 18 is achieved by means of L-shaped arms 56 connected between spacer-clamps 46 and an enlarged diameter portion 58 of output shaft 24. The shaft portion 58 is journaled in housing 22 by means of a bearing 60. Another bearing 62 journals the shaft 24 in a collar 64 depending from housing 22. Also the usual packing 66 is positioned within collar 64. As mentioned previously, the input shaft 12 is rotatively mounted in the shaft 24. For this, the shaft portion 58 is provided with a vertical well 68 for receiving the reduced diameter input shaft portion 12' and its bearing 32.

Referring now to FIG. 1, the housing 22 comprises a pair of separable upper and lower sections 22a and 22b respectively. The two sections are secured together by bolts 70 extending through holes 71 (FIG. 3) disposed around the edge of upper section 22a. Lower housing section 22b has a flange 72 containing an array of screw holes 74 for mounting the transmission on a stable base.

When the input shaft 12 is rotated, there is a twofold gear reduction. As mentioned previously, in the illustrated embodiment of the transmission it requires six turns of worm 11 for each rotation of the bearing units 16 about ring 18. Further, it requires six revolutions of the bearing units for each turn of ring 18, along with output shaft 24. Thus, the transmission provides a total gear reduction of 36:1 with remarkably small overall volume and weight. [Even higher reductions are possible by reducing the pitches of the race 36 and worm 11.]

It is a feature of this transmission that despite its high torque capability, it is reversible. That is, it can be utilized to increase speed as well as to decrease it. Thus, in the illustrated embodiment, if the input is applied to shaft 24, there will be a thirty-six fold increase in speed of the shaft 12. This is possible because of the transmission's high efficiency, i.e., there are minimal frictional losses in the system. Only rolling friction is involved between the various relatively moving parts of the transmission. An attendant advantage of this is that the drive has excellent lubrication properties, requiring only a light oiling even over extended periods of use. This all results in the transmission being capable of operating at high speeds even under heavy load conditions with relatively little maintenance.

It will be appreciated from the foregoing also that my transmission, being composed of non-flexing parts, provides a very uniform and accurate output. Also, it quickly responds to changes in the input speed or the load. Yet, despite being rigid in their axial directions, the bearing elements 16 (more specifically their balls 43), are able to follow the varying lead angles presented by the race 36. Their outer rings 44 are made strong enough to hold the balls 43 in evenly spaced relation and push them forcefully along the races 36, while the intermediate rings 42 absorb the axial thrust developed in the bearing units, yet offer minimal resistance to rotation because they are, in effect, "floating" between outer balls 43 and the inner balls 40.

It will be obvious that other means equivalent to worm 11 may be employed to drive the bearing units 16. For example, a flat disk having a spiral channel may be positioned face down on bearing units 16 coaxial with ring 18 so that the top ones of the balls 43 engage in the channels. Rotation of the disk about its axis will rotate the units 16 as described above.

Although in the illustrated embodiment of my transmission I have shown a toroidal enclosure 37, it is obvious that it can just as well be a straight tube-like enclosure, with the shaft 18 being similarly straight. In this event, the races 36 would be formed on the inside wall of the tube and the bearing units rotatively mounted on a shaft extending along the axis of the tube. The bearing units might then be driven as before by an elongated spur gear extending parallel to the tube and engaging the bearing units through a lengthwise slit in the enclosure. Rotation of the bearing units would cause the shaft to advance along the tube-like enclosure. Other configurations can be used by making the shaft 18 an articulated element.

By the term "helix-like" as applied to the races 36, it will be understood that I mean curves formed by a point moving around an axis while simultaneously being displaced along the axis and which can accommodate movement of bearing units 16 as described above. It will be appreciated that the races 36 may be provided with a variable pitch along the enclosure 37 so as to cause a variable or a "dwell" motion of bearing units 16 within enclosure 37 and hence a predetermined variable or intermittent motion of output shaft 24. Also, races 36 may reverse direction to enable the transmission to reverse automatically at predetermined points in its cycle.

Although the contours of races 36 can be round, they preferably have a "Gothic arch" profile. With this configuration, the balls engage the sides of the races, leaving a "well" at the bottom of the races. Any dirt present will drop into the "well" and not interfere with the operation of the system.

Of course, a train of my transmissions having the same or different reduction ratios and forward or reverse races may be operated in series, with the output of one unit providing the input to the next unit. In this way, extremely high reductions are possible in both the forward or reverse directions. The housings 22 in the train may be releasably held, as by bands, and the interior parts releasably locked, so that each transmission in the train may provide either a speed change or "straight-through" operation. Thus, the train will be capable of multiple gear ratios.

It will be seen from the foregoing then that I have devised a highly efficient transmission which is also extremely accurate as a result of the above-noted rigidity of the bearing units 16 and the statistical distribution of errors among the many balls. It can handle uniform or non-uniform loads with equal ease. Further, it can operate at high speeds even under heavy loads in the forward or reverse direction. By virtue of the efficient use of its bearing surfaces, the transmission has a large power-to-size ratio. Finally, the transmission can be used either as a speed increaser or reducer. As a result of these properties, it has many varied applications.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what I claim as new and secured by Letters Patent is:

I claim:

1. A transmission comprising:
   (A) means defining a helix-like race having an axis,
   (B) a shaft,
   (C) a bearing mounted on said shaft and rigidly fixed thereto in the direction of said axis,
   (D) said bearing being positioned in rolling engagement with said race,
   (E) means for rotating said bearing about said axis whereby said bearing rolls along said race and said shaft advances along said race in a direction corresponding to the axis of rotation of said bearing.

2. A transmission comprising:
   (A) means defining a helix-like race having a plurality of turns around an axis,
   (B) a plurality of hubs aligned in the direction of said axis,
   (C) a corresponding number of bearing units rotatively mounted on said hubs, said bearing units being positioned in and adapted to roll along said race,
   (D) means for rotating said bearing units about said axis whereby said bearing units and said hubs advance along said race.

3. A transmission comprising:
(A) a tubular enclosure having an interior wall and a longitudinal axis,
(B) means defining at least one helix-like race in said interior wall,
(C) a shaft extending along said longitudinal axis,
(D) at least one circular ball bearing unit rotatively mounted on said shaft and having a member in rolling engagement with said race,
(E) means for rotating said unit about said axis whereby said unit advances along said race and moves said shaft parallel to said axis.

4. A transmission comprising:
(A) enclosure means defining a plurality of parallel helix-like races inscribed in a torus,
(B) a shaft disposed along the axis of said races,
(C) at least one circular ball bearing unit rotatively mounted on said shaft, each bearing unit having a corresponding plurality of outer exposed balls positioned to roll in said races,
(D) means for rotating each bearing unit about said shaft whereby said bearing unit and said shaft advance along said axis.

5. A transmission comprising:
(A) a housing,
(B) means defining a generally toroidal enclosure within said housing and having a circular axis,
(C) a ring extending along said axis,
(D) a plurality of ball bearing units mounted on said ring, each of said bearing units having a plurality of exposed balls arranged to rotate in unison about said ring,
(E) means defining a plurality of parallel helix-like races conforming to said enclosure, each ball of each bearing unit being in rolling engagement with a different one of said races,
(F) a worm rotatively mounted within said housing and substantially perpendicular to the plane of said axis, said worm engaging at least one ball of each bearing unit and upon rotation rotating said balls about said ring, whereby said bearing units and said ring advance along said axis, and
(G) power take-off means connected to said ring and extending without said housing.

6. A transmission comprising:
(A) enclosure means defining a helix-like race,
(B) a shaft disposed along and aligned with the axis of said race,
(C) a plurality of rotative bearing units mounted on said shaft and in rolling engagement with said race,
(D) driving means for rotating said bearing units about said shaft whereby said bearing units roll along said race and said bearing units and said shaft advance along said axis, and
(E) output means coupled to said shaft.

7. A transmission as defined in claim 6 wherein each of said bearing units comprises a peripheral assemblage of exposed balls in engagement with said race, said balls being supported for rotation about said shaft.

8. A transmission as defined in claim 6 wherein each of said bearing units comprises:
(A) an inner ball race,
(B) an intermediate ring arranged concentrically with said inner ring and forming an outer ball race,
(C) a first assemblage of balls disposed between said inner and outer ball races, said intermediate ring also forming a third ball race,
(D) a second assemblage of peripherally exposed balls adapted to ride in said third race, and
(E) means for retaining said outer balls in spaced relation in said third race.

9. A transmission comprising:
(A) a housing defining a generally toroidal enclosure,
(B) means defining a plurality of parallel toroidal helix-like races in said enclosure,
(C) a ring disposed along the axis of said races,
(D) a plurality of ball bearing units rotatively mounted at fixed spaced points on said ring, said bearing units each having a peripheral assemblage of balls adapted to ride in said races,
(E) means for rotating said bearing units in unison about said ring by engaging said balls whereby said bearing units along with said ring revolve within said housing, and
(F) power take-off means coupled to said ring and extending without said housing.

10. A transmission as defined in claim 9 wherein said means for rotating said bearings comprises a worm journaled in said housing coaxially with said ring and adapted to engage adjacent ones of said balls.

11. A transmission as defined in claim 10 wherein said worm is multiply threaded.

12. A transmission as defined in claim 9 wherein said bearing units are spaced apart on said ring by an array of wedge-shaped clamps engaging said ring.

13. A transmission as defined in claim 12 wherein said power take-off means includes an output shaft journaled in said housing coaxially with said ring and a plurality of arms connected between the inner end of said output shaft and said clamps.

14. A transmission as defined in claim 9 wherein there are twelve bearing units disposed within said housing, each of said units having twelve peripheral balls.

References Cited by the Examiner

UNITED STATES PATENTS 3,174,354   3/1965   Kuehnle _____ 74—424.5

DON A. WAITE, *Primary Examiner.*